Nov. 24, 1970 — G. MARCANTONIO — 3,543,201
CROSSBAR SWITCH SELECT BAR DAMPING ASSEMBLY
Filed Sept. 12, 1969
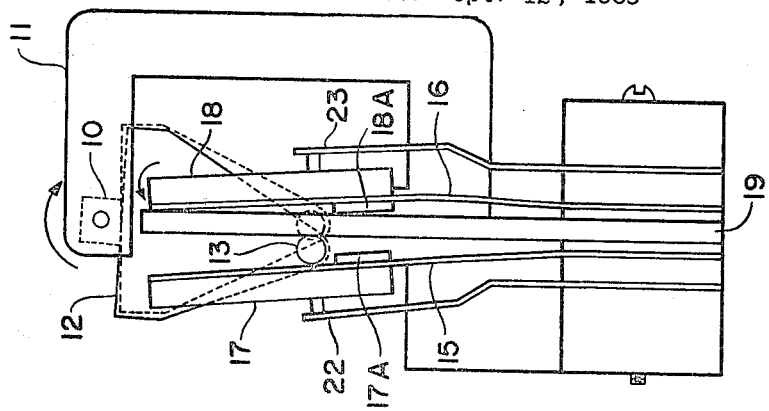
Fig. 3
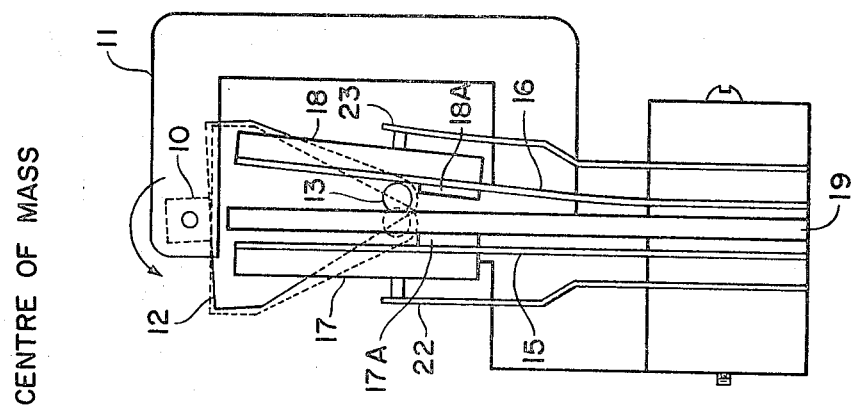
Fig. 2
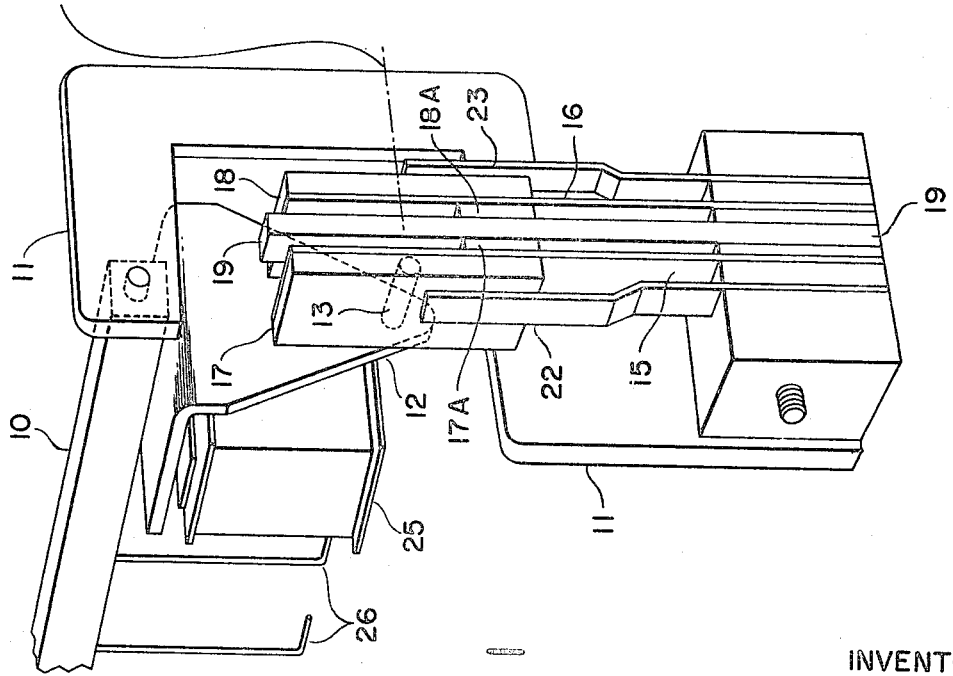
INVENTORS
GABRIEL MARCANTONIO
BY *Curphey & Erickson*
PATENT AGENTS

United States Patent Office 3,543,201
Patented Nov. 24, 1970

3,543,201
CROSSBAR SWITCH SELECT BAR DAMPING ASSEMBLY
Gabriel Marcantonio, Ottawa, Ontario, Canada, assignor to Northern Electric Company Limited, Montreal, Quebec, Canada
Filed Sept. 12, 1969, Ser. No. 857,472
Int. Cl. H01h 3/60
U.S. Cl. 335—193          2 Claims

ABSTRACT OF THE DISCLOSURE

An improved damping and restoring mechanism used in a crossbar switch for restoring a select bar to its neutral position. The spring assembly comprises a pair of cantilevered springs mounted on opposite sides of a restoring arm of the select bar. Each of the springs has a relatively massive damping weight. A stop means is interposed between the springs at a neutral position to allow the cantilevered springs to strike the stop means situated at its neutral position to dampen the motion of the select bar.

---

This invention relates to an improved damping and restoring mechanism used in a crossbar switch for restoring a select bar to its neutral position, and more particularly to means for rapidly dissipating the energy in the damping weights which coact with the select bar, thereby more efficiently damping the oscillations of the select bar.

In the operation of a crossbar switch, a select bar having a plurality of select arms, is rotated about its longitudinal axis in either of two directions, upon energization of a pair of electromagnets. The select arms, in turn, pre-set the crossbar switch so that upon actuation of a hold magnet associated with a particular select arm, a set of contacts will be actuated in order to complete a circuit through the switch. Upon release of the energized electromagnet, the select bar is returned to its neutral position by one or more restoring springs associated therewith.

One common arrangement utilizes a pair of cantilevered springs disposed to urge against opposite sides of a restoring arm on the select bar. However, the energy imparted to the select bar during the initial restoring interval by the deflected cantilevered spring urging against the restoring arm causes it to overshoot the neutral position, thus resulting in a series of damped oscillations. If this overshoot is sufficient, actuation of a second hold magnet at the wrong instant would result in erroneous operation of another set of contacts.

In an attempt to arrest this vibratory action, a damping weight has been affixed to the free end of each of the springs. The restoring arm is disposed to contact each of the weights at about their mass centre. Because of the energy dissipated in deflection of the weights, the overshoot is reduced. However, despite the addition of damping weights, the oscillation of the select bar in any existing crossbar switch is still not damped quickly enough to permit sufficiently rapid operation of the switch without compromising to a greater extent than is desirable the size of the components used and the reliability of operation. This is highly unsatisfactory, since a modern crossbar system must be optimized for maximum efficiency by combining the three important elements of rapid operation, reduced size and high reliability.

In order to achieve rapid operation it is necessary for the energy in the oscillating select bar to be dissipated as quickly as possible. One way of accomplishing rapid dissipation of energy in a moving object is by causing energy loss through inelastic collision with another object. In a crossbar switch the energy of the oscillating select bar is dissipated through collisions of the restoring arm with damping weights. However, in so doing random oscillations are induced in the damping weight and cantilevered spring assembly. Due to these random oscillations it sometimes happens that the restoring arm strikes a damping weight at a time when both the arm and the weight are moving in the same direction. This collision results in only a very small energy loss, and so the time required to stop the oscillation of the select bar is increased. Applicant has observed that the energy of the select bar is most rapidly dissipated if the restoring arm always strikes the damping weights when they are stationary.

In order to rapidly quell the oscillation of a damping weight and thereby render it stationary at the neutral position it is desirable to effect as many useful collisions as possible of the damping weight with a stop means situated at the neutral position. It has been discovered that the oscillation of a damping weight which has been displaced from the neutral position may be almost completely damped upon its initial return to the neutral position by having the weight strike a stop means situated at said neutral position, initially at a first point between the centre of mass of the weight and the fixed end of the cantilevered spring to which it is attached, and then at a second point beyond the centre of mass of the weight and towards the free end of the spring.

A projection is provided on the surface of the damping weight which bears upon the stop means so that in the neutral position contact with the stop means occurs only at said first point. The select bar is brought to its operated position in the manner previously described and, when the select bar is released, the displaced cantilevered spring urges the restoring arm toward the neutral position. Upon reaching the neutral position the damping weight attached to said cantilevered spring initially strikes the stop means at said first point. Since the centre of mass of said weight is located between said first point and the free end of the cantilevered spring to which the weight is attached, a moment results about the projection at the first point causing the weight to rotate about said first point. Consequently the weight again strikes the stop means, this time at said second point. The result of this double-hitting action is virtually immediate and complete damping of the oscillation of the damping weight. The restoring arm therefore always collides with a stationary damping weight and consequently the energy in the select arm is quickly dissipated due to the fairly substantial energy loss which occurs in each collision. In this way rapid operation of the switch may be achieved without sacrificing reduced size and high reliability.

An example embodiment of the invention will now be described with reference to the accompanying drawings in which:

FIG. 1 is a fragmentary perspective view of a crossbar switch illustrating an improved damping means for a select bar in acordance with the present invention, with the select bar shown in an inoperative position;

FIG. 2 is a front elevational view of the switch illustrated in FIG. 1 with the select bar shown in an operated position; and FIG. 3 is a front elevational view of the switch illustrated in FIG. 1, showing the select bar in a transient state during return to its inoperative position.

Referring to FIG. 1, there is illustrated a select bar 10 rotatably mounted along its longitudinal axis on a frame 11 of the crossbar switch. Affixed to the select bar 10 is a restoring arm 12 which also functions as an armature. The arm 12 has an actuating pin 13 displaced orthogonally from the longitudinal axis of the select bar 10. A pair of cantilevered leaf springs 15 and 16 are mounted on the frame 11 on opposite sides of the actuating pin 13. Each of the cantilevered springs 15 and 16 has a relatively massive rigid damping weight in the form of elongated bars 17 and 18 respectively affixed to the free ends thereof. In the inoperative or neutral position, the elongated bars 17 and 18 are tensioned against a stop means comprising a solid metal bar 19 which extends between the elongated bars 17 and 18 at the neutral position and also forms part of the frame 11. Projections 17A and 18A are provided on each of the surfaces of the elongated bars 17 and 18 respectively which bear upon the metal bar so that in the inoperative or neutral position, contact with the metal bar 19 occurs only at a first point between the centers of mass of the elongated bars 17 and 18 and the fixed ends of the cantilevered springs 15 and 16 respectively to which they are attached. A pair of tensioning leaf springs 22 and 23 mounted on the frame 11, are disposed to bear against the elongated bars 17 and 18 respectively.

Referring to FIGS. 1 to 3, in operation, energization of a select bar magnet 25 attracts the armature portion of the restoring arm 12 which causes the select bar 10 to rotate counter-clockwise from its inoperative position (FIG. 1) to an operated position (FIG. 2). This action carries with it a plurality of select arms in a well known manner, two of which are shown as 26 in FIG. 1. The rotation of the select bar 10 to the operated position causes the actuating pin 13 to bear against the elongated bar 18 and deflect both the cantilevered spring 16 and the tensioning spring 23 about their fixed ends (FIG. 2). Upon release of the select bar 10, the pretensioned springs 16 and 23, urging against the actuating pin 13, commence to return the select bar 10 to its neutral position. As the actuating pin 13 reaches the neutral or inoperative position, the elongated bar 18 strikes the metal bar 19 initially at said first point between the centre of mass of the elongated bar 18 and the fixed end of the cantilevered spring 16. Since the center of mass of the elongated bar 18 is located between said first point and the free end of the cantilevered spring 16, a moment results about the projection 18A at the first point causing the bar 18 to rotate about said first point. Consequently, the elongated bar 18 again strikes the metal bar 19, this time at a second point beyond the center of mass of the elongated bar 18 and toward the free end of the spring 16 (FIG. 3). This double-hitting action quickly damps the oscillation of the elongated bar 18 so that it is almost immediately rendered stationary at the neutral position.

The energy of the select bar 10 and restoring arm 12 is great enough to cause the actuating pin 13 to follow through beyond the neutral position and strike the stationary elongated bar 17. This collision displaces the elongated bar 17 from the neutral position (FIG. 3). The pretensioned springs 15 and 22 then coact with the actuating pin 13 and commence to return the select bar 10 to its neutral position. Upon reaching the neutral position the oscillation of the elongated bar 17 is damped in exactly the same previously described manner as were the oscillations of the elongated bar 18. It will now be seen that each time the actuating pin 13 overshoots the neutral position it collides with a stationary damping weight, thus effecting a substantial energy loss in each collision and expediting the damping of the oscillation of the select bar 10.

Even more effective damping of the oscillation of the select bar 10 may be achieved by coating the surfaces of the elongated bars 17 and 18 which bear upon the metal bar 19 with a highly energy absorptive material such as plastic. The actuating pin 13 could also be made from this material.

With such an improved system, the excursions of the select bar 10 after the initial overshoot can be made of negligible amplitude. As a result of utilizing the improved damping means, smaller select bar magnets and tensioning springs can be employed thereby further decreasing the overall size, weight and cost of the crossbar switch.

What is claimed is:
1. In a crossbar switch comprising:
 (a) a frame;
 (b) a select bar rotatably mounted on said frame, said select bar being rotatable about an axis in either direction from a neutral position;
 (c) the select bar including a restoring arm having an orthogonal component relative to said axis;
 (d) a pair of cantilevered springs each having a fixed end attached to said frame, said springs being positioned on opposite sides of the restoring arm; one or the other of said cantilevered springs being disposed to coact with the restoring arm so as to urge the select bar toward said neutral position, when the select bar is rotated in one or the other directions respectively;
 (e) each of the cantilevered springs having a relatively massive rigid weight associated therewith and at the free end thereof;
 (f) stop means interposed between the cantilevered springs at said neutral position;
 (g) the improvement comprising:
  said cantilevered springs and the relatively massive rigid weights associated therewith being adapted so that as each of the cantilevered springs urges the select bar towards the neutral position, its relatively massive rigid weight contacts the stop means initially at a first point between the fixed end of said spring and the centre of mass of its weight and thereafter at a second point towards the free end of said spring and beyond the center of mass of its weight.

2. A crossbar switch as defined in claim 1 in which each of the relatively massive rigid weights contacts the stop means at said first point while in the neutral position.

References Cited

UNITED STATES PATENTS

| | | | |
|---|---|---|---|
| 2,785,248 | 3/1957 | White | 200—166 |
| 2,789,177 | 4/1957 | Brockway | 200—166 |
| 3,474,205 | 10/1969 | Peek | 200—166 |

HAROLD BROOME, Primary Examiner

U.S. Cl. X.R.

200—166